US011908365B2

(12) United States Patent
Pyun et al.

(10) Patent No.: US 11,908,365 B2
(45) Date of Patent: Feb. 20, 2024

(54) DATA DRIVING CIRCUIT AND A DISPLAY DEVICE INCLUDING THE SAME

(71) Applicant: SAMSUNG DISPLAY CO., LTD., Yongin-si (KR)

(72) Inventors: Ki Hyun Pyun, Yongin-si (KR); Jang Mi Lee, Yongin-si (KR); Eun Jin Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/075,777

(22) Filed: Dec. 6, 2022

(65) Prior Publication Data

US 2023/0101159 A1 Mar. 30, 2023

Related U.S. Application Data

(63) Continuation of application No. 17/352,465, filed on Jun. 21, 2021, now Pat. No. 11,538,384.

(30) Foreign Application Priority Data

Nov. 10, 2020 (KR) ........................ 10-2020-0149656

(51) Int. Cl.
*G09G 3/20* (2006.01)
*G09G 3/36* (2006.01)
(Continued)

(52) U.S. Cl.
CPC ............. *G09G 3/20* (2013.01); *G09G 3/3275* (2013.01); *G09G 3/3685* (2013.01);
(Continued)

(58) Field of Classification Search
CPC ... G09G 2320/0223; G09G 2300/0426; G09G 3/3688; G09G 2310/08; G09G 3/3677;
(Continued)

(56) References Cited

U.S. PATENT DOCUMENTS 8,289,259 B2 10/2012 Hori
9,275,594 B2 3/2016 Zhu et al.
(Continued)

FOREIGN PATENT DOCUMENTS

EP 3046102 7/2016
EP 3131086 2/2017
(Continued)

*Primary Examiner* — Dismery Mercedes
(74) *Attorney, Agent, or Firm* — F. Chau & Associates, LLC

(57) ABSTRACT

A display device including: a display area including pixels connected to data lines and scan lines, the display area including a plurality of signal output lines connected to each of the scan lines through a contact; a data driver including a first data driving circuit at a side of the display area; a scan driver disposed at the side of the display area; and a timing controller, wherein the first data driving circuit includes: output buffers which respectively output data signals to first to k-th data lines (k is an integer greater than 2) of the data lines; and an output delay controller which transmits the data signals to the output buffers through first to k-th transmission lines, and controls delay times of the data signals output to the first to k-th transmission lines based on position information of a pixel row to which the data signals are supplied.

7 Claims, 13 Drawing Sheets

(51) Int. Cl.
*G09G 3/3275* (2016.01)
*G09G 5/00* (2006.01)

(52) U.S. Cl.
CPC ........... *G09G 3/3688* (2013.01); *G09G 5/008* (2013.01); *G09G 2310/027* (2013.01); *G09G 2310/0291* (2013.01); *G09G 2310/08* (2013.01); *G09G 2320/02* (2013.01); *G09G 2320/0223* (2013.01); *G09G 2320/0233* (2013.01); *G09G 2370/08* (2013.01)

(58) Field of Classification Search
CPC .. G09G 3/3648; G09G 3/3266; G09G 3/3275; G09G 3/20; G09G 2300/0819; G09G 2320/0242; G09G 2320/02; G06F 3/04166
See application file for complete search history.

(56) References Cited

U.S. PATENT DOCUMENTS

| | | | | |
|---|---|---|---|---|
| 9,607,581 | B2 | 3/2017 | Park et al. | |
| 9,685,125 | B2 | 6/2017 | Ha et al. | |
| 10,049,637 | B2 | 8/2018 | Lee et al. | |
| 10,074,314 | B2 * | 9/2018 | Lee | H10K 59/1315 |
| 10,136,139 | B2 | 11/2018 | Lee et al. | |
| 10,410,595 | B2 * | 9/2019 | Ishii | G09G 3/3677 |
| 10,504,413 | B2 * | 12/2019 | Lee | G09G 3/2092 |
| 10,580,339 | B2 * | 3/2020 | Lim | G09G 3/006 |
| 10,685,617 | B2 | 6/2020 | Im et al. | |
| 11,145,269 | B2 | 10/2021 | Yabuki | |
| 2010/0164967 | A1 | 7/2010 | Lee | |
| 2011/0316821 | A1 | 12/2011 | Suzuki et al. | |
| 2013/0038582 | A1 | 2/2013 | Yen | |
| 2014/0232713 | A1 * | 8/2014 | Hsu | G09G 3/3685 345/99 |
| 2014/0375922 | A1 | 12/2014 | Park et al. | |
| 2015/0097871 | A1 * | 4/2015 | Kumeta | G09G 3/3225 345/690 |
| 2015/0364099 | A1 | 12/2015 | Shibuya | |
| 2016/0284297 | A1 | 9/2016 | Cheng et al. | |
| 2016/0358576 | A1 * | 12/2016 | Lee | G09G 3/3674 |
| 2017/0047001 | A1 * | 2/2017 | Shin | G09G 3/3275 |
| 2017/0193914 | A1 * | 7/2017 | Heo | G09G 3/3611 |
| 2017/0323611 | A1 | 11/2017 | Jo et al. | |
| 2019/0051337 | A1 | 2/2019 | Jo et al. | |
| 2022/0148479 | A1 | 5/2022 | Pyun et al. | |

FOREIGN PATENT DOCUMENTS

| | | |
|---|---|---|
| KR | 10-0884998 | 2/2009 |
| KR | 10-2015-0081397 | 7/2015 |
| KR | 10-2015-0107943 | 9/2015 |
| KR | 10-1641691 | 7/2016 |
| KR | 10-2019-0023027 | 3/2019 |

* cited by examiner

DATA DRIVING CIRCUIT AND A DISPLAY DEVICE INCLUDING THE SAME

CROSS-REFERENCE TO RELATED APPLICATIONS

This application is a continuation of U.S. patent application Ser. No. 17/352,465 filed on Jun. 21, 2021, which claims priority under 35 U.S.C. § 119 to Korean Patent Application No. 10-2020-0149656 filed in the Korean Intellectual Property Office on Nov. 10, 2020, the disclosures of which are incorporated by reference herein in their entireties.

1. TECHNICAL FIELD

The present invention relates to an electronic device, and more particularly, to a display device.

2. DESCRIPTION OF THE RELATED ART

A display device is an output device for presentation of information in visual form. In general, a display device has a dual side driving structure in which a scan driver is disposed at one side of a display area and a data driver is disposed at the other side thereof. A display device with a narrow bezel has seen increased demand. To implement a narrow bezel, the display device may have a single side driving structure in which a scan driver and a data driver are disposed together at the same side of the display area.

In the display device having the single side driving structure, scan lines may be formed with different lengths, and due to this line configuration, a non-uniform of resistive-capacitive (RC) load may occur at different positions in the display area. Accordingly, the timing when a scan signal and a data signal are supplied to each of the pixels may not be synchronized, and thus, there may be a deviation in a data charging rate as well as degradation in display quality.

SUMMARY

An embodiment of the present invention provides a display device including: a display area including pixels connected to data lines and scan lines, wherein the display area includes a plurality of signal output lines connected to each of the scan lines through a contact; a data driver including a first data driving circuit disposed at a side of the display area to drive the data lines; a scan driver disposed at the side of the display area to drive the scan lines; and a timing controller for controlling the data driver and the scan driver, wherein the first data driving circuit includes: output buffers which respectively output data signals to first to k-th data lines (wherein k is an integer greater than 2) of the data lines; and an output delay controller which transmits the data signals to the output buffers through first to k-th transmission lines, and controls delay times of the data signals output to the first to k-th transmission lines based on position information of a pixel row to which the data signals are to be supplied.

The output delay controller may control the delay times based on distances between one of the contacts and the first to k-th data lines in a first direction.

Times at which the data signals are output from the output buffers to the first to k-th data lines may be respectively adjusted based on the delay times.

The delay times may increase from the k-th data line to the first data line in response to driving of a second pixel row.

A contact of a second scan line corresponding to the second pixel row may be closer to the k-th data line than to the first data line in a first direction.

The delay times may increase from the first data line to the k-th data line in response to driving of a first pixel row.

A contact of a first scan line corresponding to the first pixel row may be closer to the first data line than to the k-th data line in a first direction.

The delay time of the first data line and the delay time of the k-th data line may be greater than the delay time of a j-th data line (wherein j is an integer greater than 1 and less than k) in response to driving of a third pixel row.

A contact of a third scan line corresponding to the third pixel row may be closer to the j-th data line than to the first data line and the k-th data line in a first direction.

The output delay controller may include: a clock frequency divider which divides a frequency of a data transmission clock supplied from the timing controller to generate a reference clock; a reference period generator which generates reference periods for delaying an output of the data signals based on a period of the reference clock; a minimum delay selector which selects one of the reference periods as a minimum delay value based on the position information of the pixel row to which the data signals are to be supplied; and a delay time determiner which determines the delay times based on the minimum delay value and a delay control signal, and delays and outputs the data signals by the delay times.

The delay time determiner may include: delay cells connected in series to delay and output an input signal based on the minimum delay value; and a plurality of switches connected to output terminals of the delay cells and controlled in response to the delay control signal.

One of the switches may be turned on in response to the delay control signal.

The data driver may further include: a second data driving circuit which has the same configuration as the first data driving circuit and drives different data lines than the first data driving circuit.

Output times at which data signals are output from the second data driving circuit may be different from output times at which the data signals are output from the first data driving circuit.

The display area may include first, second and third pixel blocks continuously arranged in a first direction, and the plurality of signal output lines may include: first output lines connected to each of the scan lines in the first pixel block; second output lines connected to each of the scan lines in the second pixel block; and third output lines connected to each of the scan lines in the third pixel block.

The scan lines may extend in the first direction, and the first to third output lines may extend in a second direction crossing the first direction.

Lengths of the first to third output lines may increase in the first direction.

An embodiment of the present invention provides a data driving circuit including: a digital to analog converter which converts image data into analog data signals; output buffers which respectively output the data signals to first to k-th data lines (wherein k is an integer greater than 2); and an output delay controller which transmits the data signals to the output buffers through first to k-th transmission lines, and controls delay times of the data signals output to the first to k-th transmission lines based on position information of a pixel row to which the data signals are to be supplied, wherein output times of the data signals output from the output buffers are different due to a difference in the delay times.

The output delay controller may include: a clock frequency divider which divides a frequency of a data transmission clock to generate a reference clock; a reference period generator which generates reference periods for delaying an output of the data signals based on a period of the reference clock; a minimum delay selector which selects one of the reference periods as a minimum delay value based on the position information; and a delay time determiner which determines delay times of the first to k-th transmission lines based on the minimum delay value and a delay control signal, and delays and outputs the data signals by the delay times.

Times at which the data signals are output from the output buffers to the first to k-th data lines may be respectively adjusted based on the delay times.

An embodiment of the present invention provides a display device including: a display area including pixels connected to data lines and scan lines; a data driver and a scan driver disposed on a same side of a display area, the scan driver being connected to each of the scan lines by a plurality of output signal lines, the data driver including a data driving circuit that includes: an output delay controller configured to control delay times of data signals to be different from each other based on distances between contact points of the scan lines and the output signal lines and the data lines.

In a pixel row to which the data signals are to be supplied, the delay times may increase from a first data line to a k-th data line (wherein k is an integer greater than 2).

A contact point of the scan line and the output signal line corresponding to the pixel row may be closer to the first data line than the k-th data line.

In a pixel row to which the data signals are to be supplied, the delay times decrease from a first data line to a k-th data line (wherein k is an integer greater than 2).

A contact point of the scan line and the output signal line corresponding to the pixel row may be closer to the k-th data line than to the first data line.

DETAILED DESCRIPTION OF THE EMBODIMENTS

Figure 1:
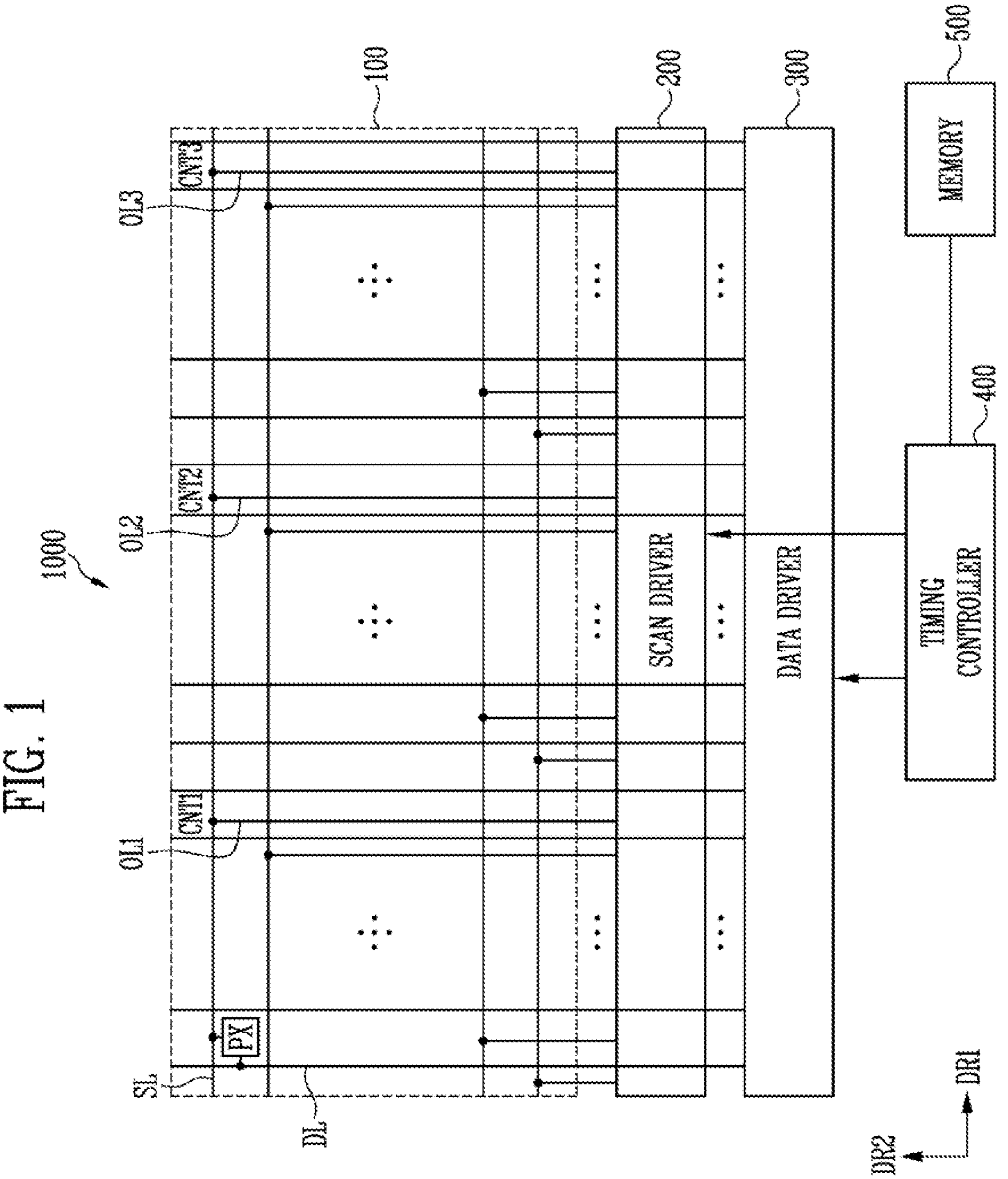
FIG. 1 is a block diagram showing a display device according to an embodiment of the present invention.

Hereinafter, embodiments of the present invention will be described in further detail with reference to the accompanying drawings. Like reference numerals may be used for like elements in the drawings, and redundant explanations for like elements may be omitted.

FIG. 1 is a block diagram showing a display device according to an embodiment of the present invention.

Referring to FIG. 1, the display device 1000 may include a display area 100, a scan driver 200, a data driver 300, and a timing controller 400.

The display device 1000 may be a self-luminous display device including a plurality of self-luminous elements. For example, the display device 1000 may be an organic light-emitting display device including organic light-emitting elements, an inorganic light-emitting display device including inorganic light-emitting elements, or a display device including light-emitting elements composed of a combination of inorganic and organic materials. However, this is an example, and the display device 1000 may be a liquid crystal display device, a plasma display device, a quantum dot display device, or the like.

The display device 1000 may be a flat display device, a flexible display device, a curved display device, a foldable display device, or a bendable display device. In addition, the display device 1000 may be applied to a transparent display device, a head-mounted display device, a wearable display device, and the like.

The display area 100 may include a plurality of pixels PX connected to a scan lines SL and a data lines DL. The display device 1000 according to an embodiment of the present invention is a display device 1000 having a single side driving structure in which the data driver 300 and the scan driver 200 are disposed together at one side of the display area 100. In an embodiment of the present invention, to apply a single side driving structure, each of the scan lines SL may be connected to a first output line OL1, a second output line OL2, and a third output line OL3 at each of first, second and third contacts CNT1, CNT2, and CNT3.

The display area 100 may be divided into a first pixel block, a second pixel block, and a third pixel block depending on an area in which the first output line OL1, the second output line OL2, and the third output line OL3 are disposed. The scan line SL is shown to be connected to the three output lines OL1, OL2, and OL3 in FIG. 1, but the present invention is not limited thereto. For example, the scan line SL may be connected to more than three or less than three output lines.

The scan line SL may extend in the first direction DR1 (e.g., a pixel row direction or a horizontal direction) and may be connected to pixels PX in a pixel row corresponding thereto. A scan signal may be supplied to the pixels PX through the scan line SL. In other words, each of the scan lines SL may define a pixel row.

The first output line OL1 may extend in a second direction DR2, and may be connected to the scan line SL through the first contact CNT1. For example, the second direction DR2 may correspond to a pixel column direction. The first output line OL1 may electrically connect the scan driver 200 and the scan line SL.

When a single output line is connected to the scan line SL, a deviation of a resistive-capacitive (RC) load (or an RC delay) between a portion close to a contact (e.g., CNT1) and a portion far from a contact (e.g., CNT2) may increase. To reduce the deviation of the RC load, the scan line SL may be connected to a plurality of output lines OL1, OL2, and OL3 spaced apart from each other.

The second output line OL2 may extend in the second direction DR2, and may be connected to the scan line SL through the second contact CNT2. The second output line OL2 may electrically connect the scan driver 200 and the scan line SL.

The third output line OL3 may extend in the second direction DR2, and may be connected to the scan line SL through the third contact CNT3. The third output line OL3 may electrically connect the scan driver 200 and the scan line SL.

In an embodiment of the present invention, each of the first to third output lines OL1, OL2, and OL3 may be connected to the scan lines SL in a one-to-one manner. As shown in FIG. 1, the first to third output lines OL1, OL2, and OL3 may be arranged such that their length gradually increases toward the first direction DR1. For example, at the left side of the first output line OL1 in FIG. 1, the output lines may increase in length as they are connected to scan lines SL closest to the scan driver 200 to the scan line SL connected to the first output line OL1.

The data lines DL may be connected to the pixels PX in a pixel column unit.

The scan driver 200 may receive a clock signal, a scan start signal, and the like from the timing controller 400 and supply the scan signal to the scan lines SL. For example, the scan driver 200 may sequentially supply a first output signal for supplying the scan signal to the scan lines SL to the first output lines OL1. The scan driver 200 may sequentially supply a second output signal for supplying the scan signal to the scan lines SL to the second output lines OL2. The scan driver 200 may sequentially supply a third output signal for supplying the scan signal to the scan lines SL to the third output lines OL3.

The first to third output signals may be set to a gate-on level (e.g., a low voltage or high voltage) corresponding to a type of a transistor to which the scan signal is supplied. In other words, the first to third output signals may be generated and supplied as scan signals. To drive the scan line SL, the first to third output signals may be substantially simultaneously supplied to the first to third output lines OL1, OL2, and OL3, respectively. In other words, the second output signal may be supplied to the second output line OL2 while the first output signal is supplied to the first output line OL1. However, output times of the first to third output signals supplied to the first to third output lines OL1, OL2, and OL3 may be finely adjusted in consideration of the deviation of the RC load of the scan lines SL. In an embodiment of the present invention, the scan driver 200 may independently include a configuration for driving the first output lines OL1, a configuration for driving the second output lines OL2, and a configuration for driving the third output lines OL3.

The data driver 300 may generate a data signal based on the image data supplied from the timing controller 400 and supply the data signal to the data lines DL. The data driver 300 may apply analog data signals (or data voltages) corresponding to image data in digital format to the data lines DL in units of pixel rows.

In an embodiment of the present invention, the data driver 300 may include a plurality of data driving circuits that drive the data lines DL corresponding to certain areas of the display area 100. The data driver 300 may control an output time (or a delay time) of data signals depending on positions of data driving circuits and positions of pixel rows to which data signals are to be supplied.

The timing controller 400 may receive input image data from an image source such as an external graphic device. The timing controller 400 may generate image data suitable for an operating condition of the display area 100 based on the input image data and provide the generated image data to the data driver 300. In addition, the timing controller 400 may generate control signals for controlling the scan driver 200 and the data driver 300 to meet the operating condition of the display area 100, and provide the control signals to each of the scan driver 200 and the data driver 300.

In an embodiment of the present invention, the display device 1000 may further include a memory 500. For example, the memory 500 may include delay information, which is information related to a time at which a data signal should be delayed according to the pixel row, a position of the data driving circuit, and a position of a data line. Such delay information may be supplied to the data driver 300 through the timing controller 400 or may be directly provided to the data driver 300 in synchronization with driving of the timing controller 400.

For example, each of the data driving circuits may determine delay times during which data signals are delayed based on position information of the pixel row included in the delay information. The position information of the pixel row may include information on delay times corresponding to each of the data lines in the corresponding pixel row.

Figure 2:
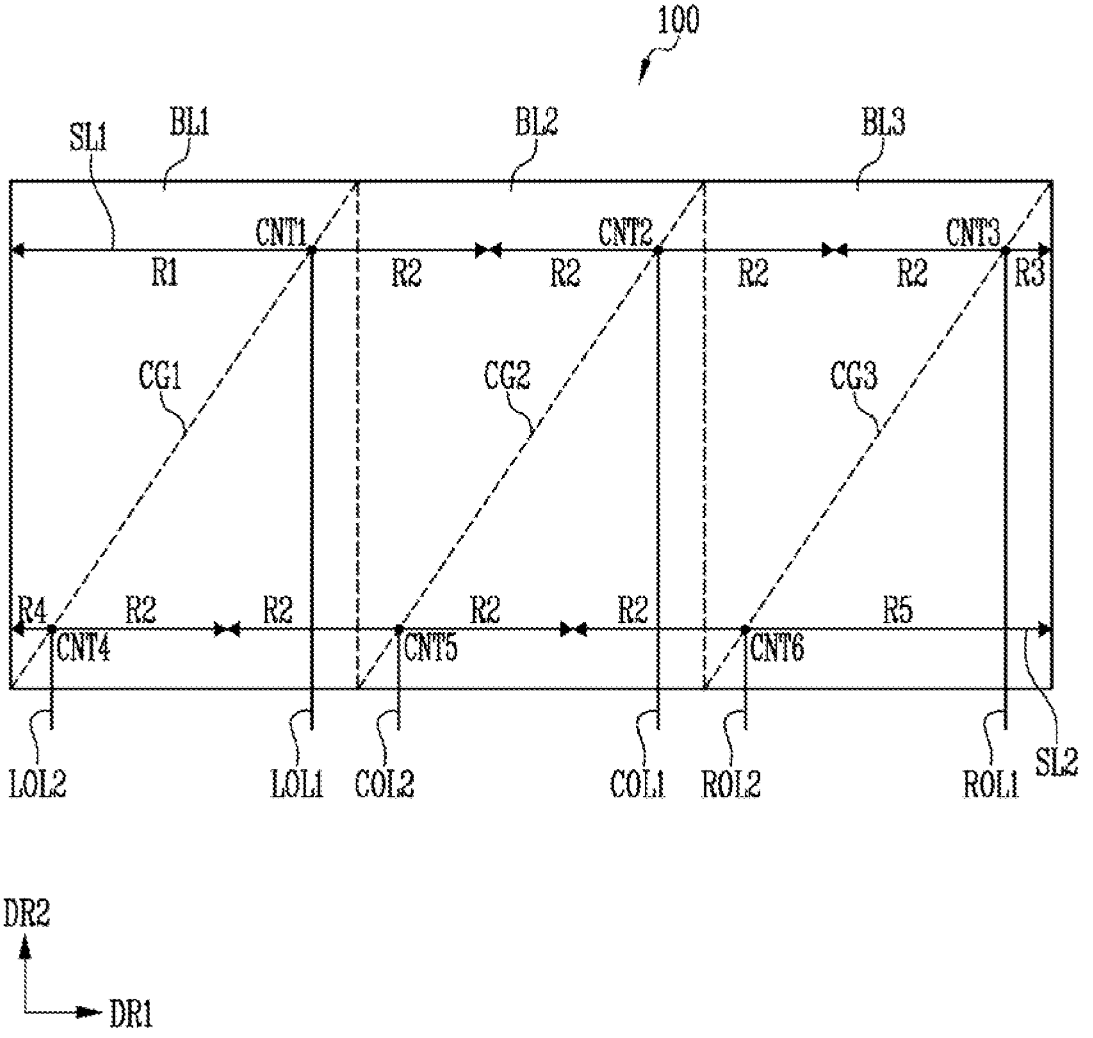
FIG. 2 is a diagram illustrating an example of a display area included in the display device of FIG. 1.
Figure 3:
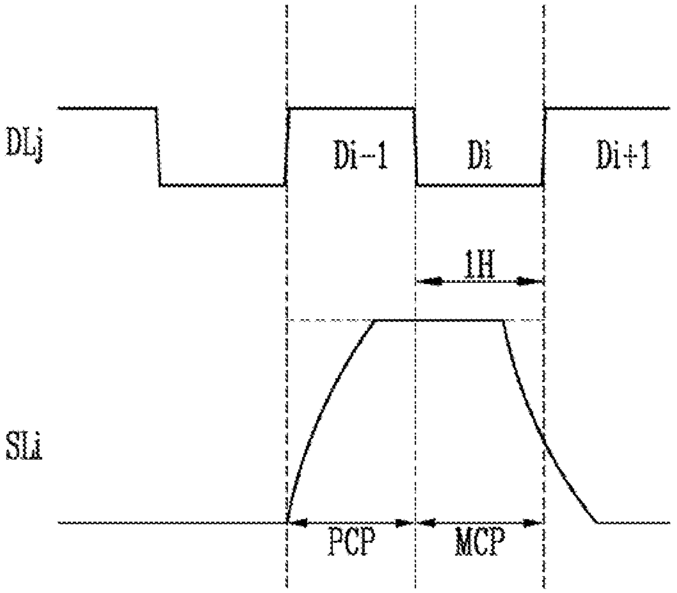
FIG. 3 is a timing diagram illustrating an example of signals supplied to a pixel included in the display device of FIG. 1.

FIG. 2 is a diagram for illustrating an example of a display area included in the display device of FIG. 1, and FIG. 3 is a timing diagram illustrating an example of signals supplied to a pixel included in the display device of FIG. 1.

Referring to FIGS. 1 to 3, the display area 100 of the display device 1000 having a single side driving structure may be divided into a plurality of pixel blocks BL1, BL2, and BL3 according to arrangements of output lines LOL1, LOL2, COL1, COL2, ROL1, and ROL2, and contacts CNT1, CNT2, CNT3, CNT4, CNT5 and CNT6.

It can be understood that only some of all output lines and scan lines are shown in FIG. 2.

Left output lines LOL1 and LOL2 may be disposed in the first pixel block BL1. A first left output line LOL1 may be connected to a first scan line SL1 through a first contact CNT1. A second left output line LOL2 may be connected to a second scan line SL2 through a fourth contact CNT4. The second scan line SL2 may be disposed closer to the scan driver 200 and the data driver 300 with respect to the first scan line SL1.

The left output lines LOL1 and LOL2 do not contact or connect to each other. Accordingly, the first and fourth contacts CNT1 and CNT4 of the first pixel block BL1 may be arranged such that a diagonal line may pass therethrough with respect to the first direction DR1. For example, as shown in FIG. 2, the arrangement of the first and fourth contacts CNT1 and CNT4 of the first pixel block BL1 may form a first contact group CG1 in a diagonal shape with respect to the first direction DR1. It is to be understood that additional contacts would be part of the first contact group CG1 if further scan lines were provided between the first and second scan lines SL1 and SL2.

Similarly, center output lines COL1 and COL2 may be disposed in the second pixel block BL2. A first center output line COL1 may be connected to the first scan line SL1 through the second contact CNT2. A second center output line COL2 may be connected to the second scan line SL2 through the fifth contact CNT5. The arrangement of the second and fifth contacts CNT2 and CNT5 of the second pixel block BL2 may form a second contact group CG2 in a diagonal shape with respect to the first direction DR1.

Right output lines ROL1 and ROL2 may be disposed in the third pixel block BL3. A first right output line ROL1 may be connected to the first scan line SL1 through the third contact CNT3. A second right output line ROL2 may be connected to the second scan line SL2 through a sixth contact CNT6. The arrangement of the third and sixth contacts CNT3 and CNT6 of the third pixel block BL3 may form a third contact group CG3 in a diagonal shape with respect to the first direction DR1.

However, this is an example, and the arrangement trend of the first to third contact groups CG1, CG2, and CG3 is not limited thereto, and may be modified in various forms according to the shape of the display device 1000.

In an embodiment of the present invention, one pixel row may be defined by connecting a plurality of pixels PX to the first scan line SL1. The scan signal supplied to the pixels PX through the first scan line SL1 may be provided from the first left output line LOL1, the first center output line COL1, and the first right output line ROL1. For example, the scan signal may be substantially simultaneously provided to the first left output line LOL1, the first center output line COL1, and the first right output line ROL1 from the scan driver 200.

In other words, to reduce the deviation of the RC delay of the scan signal supplied to the pixels PX connected to the first scan line SL1, the scan signal may be supplied substantially simultaneously from the first left output line LOL1, the first center output line COL1, and the first right output line ROL1. Other scan lines and pixel rows may also have the configuration similar to the configuration described above. Accordingly, other scan lines may be provided with scan signals supplied substantially simultaneously from a plurality of output lines.

The RC delay of the output signal may increase as the length of the line transmitting the signal increases. For example, the equivalent resistance (or equivalent impedance) of the first left output line LOL1 may include a first resistance component R1 formed at a left side of the first contact CNT1, and a second resistance component R2 formed at a right side of the first contact CNT1. Since a portion of the first scan line SL1 between the first contact CNT1 and the second contact CNT2 is affected by both a signal supplied from the first left output line LOL1 and a signal supplied from the first center output line COL1, the resistance component (or the RC delay) in the center portion of the first contact CNT1 and the second contact CNT2 is the largest resistance component between the first contact CNT1 and the second contact CNT2. The largest resistance component between the first contact CNT1 and the second contact CNT2 may be denoted by the two arrows facing and contacting each other in the area between the first contact CNT1 and the second contact CNT2.

Similarly, the equivalent resistance of the first center output line COL1 may include a second resistance component R2 at each side of the second contact CNT2. The equivalent resistance of the first right output line ROL1 may include the second resistance component R2 formed at a left side of the third contact CNT3 and a third resistance component R3 formed at a right side of the third contact CNT3.

Here, according to the length of the corresponding portion of the scan line, the first resistance component R1 may be the largest and the third resistance component R3 may be the smallest.

Accordingly, in the first scan line SL1, the RC delay of the scan signal in the first pixel block BL1 having the greatest effect of the first left output line LOL1 may be the largest, and the RC delay of the scan signal in the third pixel block BL3 having the greatest effect of the first right output line ROL1 may be the smallest. In other words, in certain scan lines at the upper end portion of the display area 100 including the first scan line SL1, the RC delay of the scan signal may be substantially decreased from the first pixel block BL1 to the third block BL3. This trend may be maintained until the first resistance component R1 becomes smaller than the second resistance component R2.

As described above, in the first scan line SL1, the RC delay at the third contact CNT3 may be the smallest, and the RC delay at the leftmost portion of the first pixel block BL1 may be the largest.

The second scan line SL2 may have a trend of the RC delay of the scan signal opposite to that of the first scan line SL1. In the second scan line SL2, the RC delay of the scan signal in the first pixel block BL1 may be the smallest, and the RC delay of the scan signal in the third pixel block BL3 may be the largest. In other words, the RC delay of the scan signal may increase from the first pixel block BL1 to the third pixel block BL3. For example, in the second scan line SL2, the RC delay at the fourth contact CNT4 may be the smallest, and the RC delay at the rightmost portion of the third pixel block BL3 may be the largest. In the second scan line SL2, the second resistance component R2 may be formed at both sides of the fifth contact CNT5, a fourth resistance component R4 may formed at the left side of the fourth contact CNT4 and a fifth resistance component R5 may be formed at the right side of the sixth contact CNT6.

The RC delay of the data signal supplied through the data lines DL may increase as the distance from the data driver 300 increases. Accordingly, the RC delay of the data signal supplied to the pixels PX of the first scan line SL1 may be greater than the RC delay of the data signal supplied to the pixels PX of the second scan line SL2.

When the display device 1000 is driven as shown in the timing diagram of FIG. 3, the scan signal may be supplied to an i-th scan line SLi (wherein i is an integer greater than 1) for two horizontal periods (e.g., two single horizontal periods 1H). For example, in a high-resolution display device driven at a high speed of 120 Hz or higher, the scan signal may be supplied for two horizontal periods to secure a charging time for a data signal.

The scan signal may include a pre-charge period PCP and a main-charge period MCP. In the pre-charge period PCP, an i−1-th data signal Di−1 corresponding to an i−1-th pixel row may be supplied to a j-th data line DLj (where j is a natural number), and in the main-charge period MCP, an i-th data signal Di corresponding to the i-th pixel row may be supplied to the j-th data line DLj. The pixels (hereinafter referred to as a corresponding pixel) corresponding to the i-th scan line SLi and the j-th data line DLj may emit light based on the supplied i-th data signal Di.

A slew rate of the scan signal may change due to the RC delay. For example, a transition time of the scan signal may increase due to the RC delay in the i-th scan line SLi. When a rising time of the scan signal becomes longer, a supply time of the i-th data signal Di may be shortened, so that a data charging rate of the pixel may be reduced. In addition, when a falling time of the scan signal becomes longer, data signal noise from the i+1-th data signal Di+1 being supplied to the corresponding pixel may be generated. Such reduction of the charging rate and noise may cause image defects.

Accordingly, the scan driver 200 may control an output timing of the output signals in the left output line, the center output line, and the right output line based on a waveform when the RC delay of the scan signal is the largest. For example, in the first scan line SL1, with respect to the RC delay of the output supplied to the first left output line LOL1, the signal output of the outputs supplied to the first center output line COL1 and the first right output line ROL1 may be delayed. This is so, because the RC delay of the first scan line SL1 increases from left to right in FIG. 2.

In response to a falling RC delay of the scan signal, the data driver 300 may individually perform an output delay of the data signal for the data lines. In addition, in response to a change in the RC delay due to the arrangement of the diagonal shape of the first to third contact groups CG1, CG2, CG3, the data driver 300 may change the output delay of the data signal according to the driven pixel rows.

The configuration and driving method of the data driver 300 in the display device 1000 having such single side driving structure will be described in detail with reference to FIG. 4 below.

Figure 4:
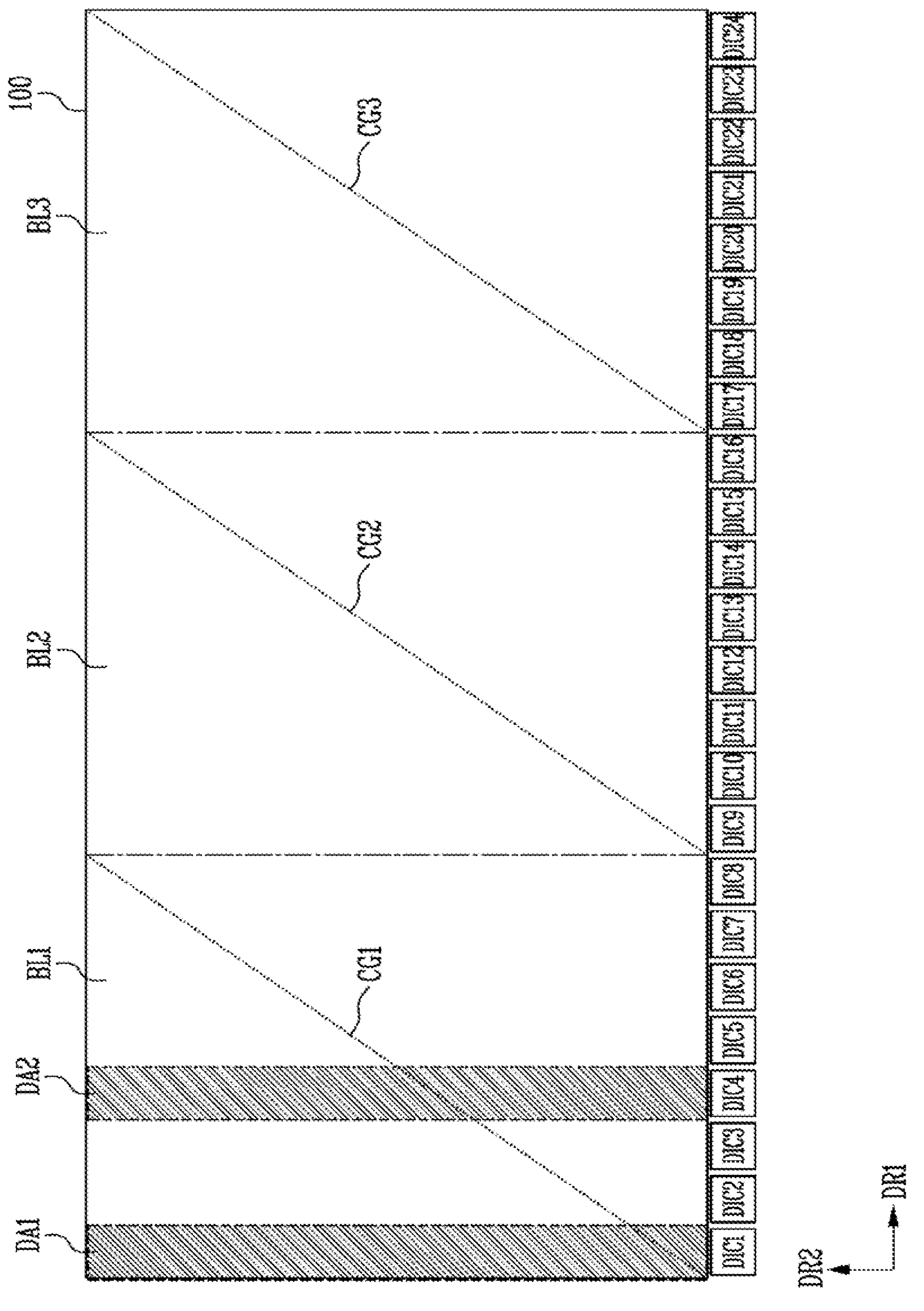
FIG. 4 is a diagram illustrating an example of a data driver and a display area included in the display device of FIG. 1.

FIG. 4 is a diagram illustrating an example of a data driver and a display area included in the display device of FIG. 1.

Referring to FIGS. 1, 2, and 4, the data driver 300 may include a plurality of data driving circuits DIC1 to DIC24. The data driving circuits DIC1 to DIC24 may be referred to as first to twenty-fourth data driving circuits.

The data driving circuits DIC1 to DIC24 may be disposed at one side of the display area 100. Each of the data driving circuits DIC1 to DIC24 may drive some of the data lines DL.

For example, the first data driving circuit DIC1 may be connected to the data lines DL disposed in the first driving area DA1 of the display area 100. The first data driving circuit DIC1 may supply data signals to the data lines DL disposed in the first driving area DA1.

The fourth data driving circuit DIC4 may be connected to the data lines DL disposed in the second driving area DA2 of the display area 100. The fourth data driving circuit DIC4 may supply data signals to the data lines DL disposed in the second driving area DA2.

Since delay characteristics of the scan signals in the first driving area DA1 and the second driving area DA2 are different from each other, the delay time of the data signals output from the first data driving circuit DIC1 and the fourth data driving circuit DIC4 may be independently controlled. This may be accomplished, for example, by controlling the data signals output from the first data driving circuit DIC1 with a first control signal and controlling the data signals output from the fourth data driving circuit DIC4 with a second control signal different from the first control signal. In addition, the delay characteristics of the data signals of the first data driving circuit DIC1 and the fourth data driving circuit DIC4 corresponding to the supply of the scan signal in the second direction DR2 or in the opposite direction to the second direction DR2 may also be different from each other.

FIG. 4 illustrates that the data driver 300 includes 24 data driving circuits DIC1 to DIC24, but the present invention is not limited thereto. The number of the data driving circuits may be determined according to the size of the display area 100, the application of the display device 1000, and the like.

Figure 5:
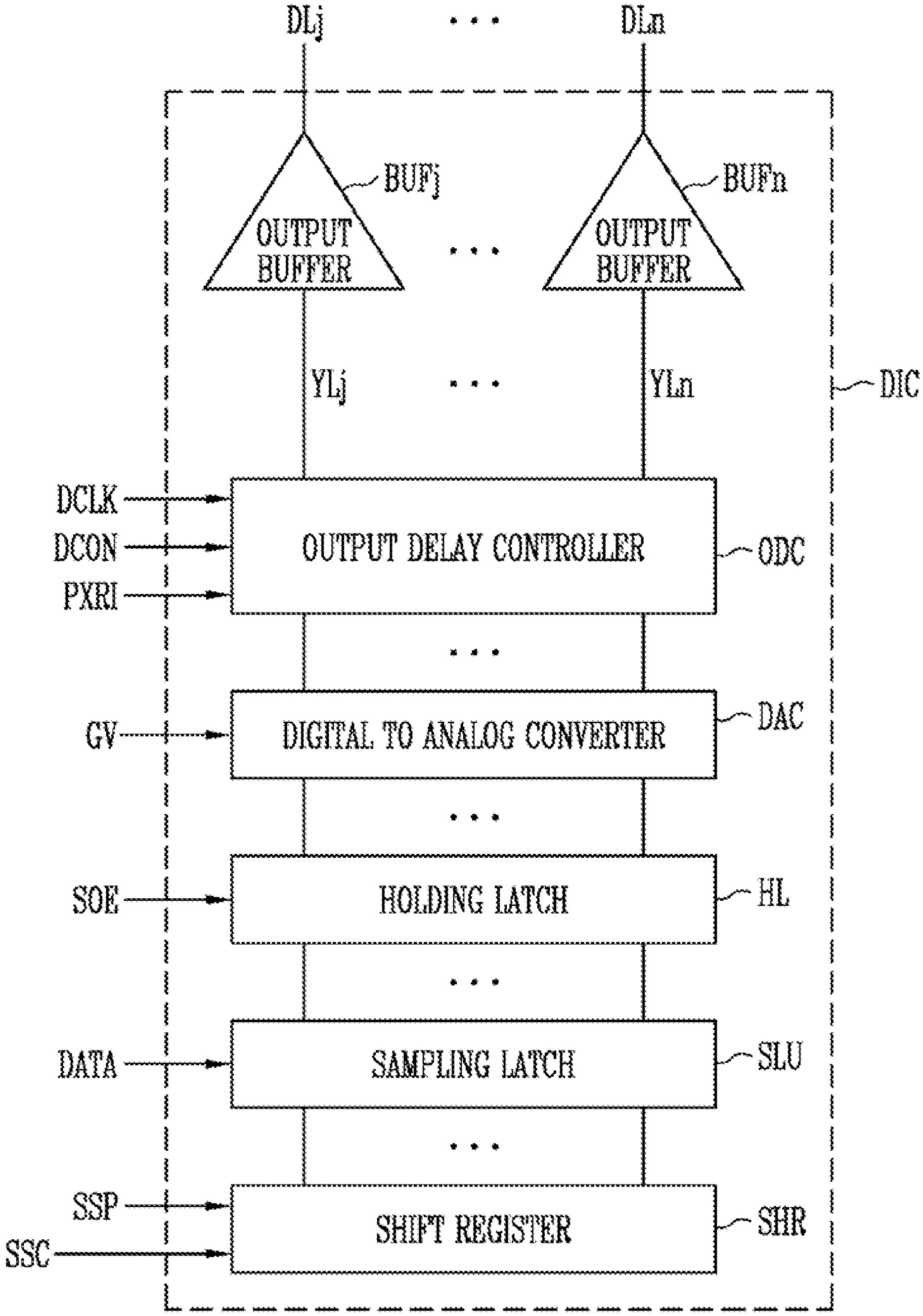
FIG. 5 is a diagram illustrating a data driving circuit according to embodiments of the present invention.

FIG. 5 is a diagram illustrating a data driving circuit according to embodiments of the present invention.

The data driving circuit DIC of FIG. 5 may be one of the data driving circuits DIC1 to DIC24 of FIG. 4.

Referring to FIGS. 1, 4, and 5, the data driving circuit DIC may include a shift register SHR, a sampling latch SLU, a holding latch HL, a digital to analog converter DAC, and an output delay controller ODC, and output buffers BUFj to BUFn (wherein j is a positive integer and n is an integer greater than j).

The shift register SHR may receive a source start pulse SSP and a source shift clock SSC from the timing controller 400. The shift register SHR may sequentially generate sampling signals while shifting the source start pulse SSP every one period of the source shift clock SSC. The number of the sampling signals may correspond to the number of data lines DLj to DLn. As an example, when the display device 1000 further includes a demultiplexer between the data driving circuit DIC and the data lines DLj to DLn, the number of the sampling signals may be smaller than the number of data lines DLj to DLn.

The sampling latch SLU may include sampling latch units corresponding to the number of data lines DLj to DLn. The sampling latch SLU may sequentially receive image data DATA for an image frame from the timing controller 400. The sampling latch SLU may store image data DATA sequentially provided from the timing controller 400 in response to sampling signals sequentially supplied from the shift register SHR.

The holding latch HL may receive a source output enable signal SOE from the timing controller 400. In response to the source output enable signal SOE, the holding latch HL may receive and store the image data DATA from the sampling latch SLU. The holding latch HL may supply the image data DATA stored therein to the digital to analog converter DAC. The holding latch HL may include holding latch units of the number corresponding to the number of data lines DLj to DLn. In other words, the number of holding latch units may be the same as the number of data lines DLj to DLn.

The digital to analog converter DAC may include digital to analog conversion units of the number corresponding to the number of data lines DLj to DLn. Each of digital to analog conversion units of the digital to analog converter DAC may provide gray voltages GV (corresponding to data signals) corresponding to the image data DATA stored in the corresponding holding latch to the output delay controller ODC.

The gray voltage GV supplied to the output delay controller ODC may be a data signal of a corresponding pixel row and a corresponding data line.

The gray voltage GV may be provided to the digital to analog converter DAC from a gray voltage generator. The gray voltage generator may include a red gray voltage generator, a green gray voltage generator, and a blue gray voltage generator. In this case, the gray voltage GV may be set so that the luminance corresponding to each grayscale follows a gamma curve.

The output delay controller ODC may transmit data signals to the output buffers BUFj to BUFn through transmission lines YLj to YLn. The output delay controller ODC may control delay times of the data signals output to each of the transmission lines YLj to YLn based on the position of the pixel row to which the data signals are to be supplied. In an embodiment of the present invention, the output delay controller ODC may control delay times based on distances between the first to third contacts CNT1 to CNT3 and the data lines DLj to DLn in the first direction DR1.

In response to the delay times, output times at which data signals output to the data lines DLj to DLn are output may be different from each other. For example, corresponding to some pixel rows, the delay times increase from the j-th data line DLj to the n-th data line DLn, and corresponding to other pixel rows, the delay times decrease from the j-th data line DLj to the n-th data line DLn.

The output buffers BUFj to BUFn may supply outputs of the output delay controller ODC as data signals to corresponding data lines DLj to DLn, respectively. In an embodiment of the present invention, the output buffers BUFj to BUFn may include an operational amplifier. For example, each of the output buffers BUFj to BUFn may be a buffer of a current mode logic (CML) structure or a CMOS structure. However, this is an example, and the structure of the output buffers BUFj to BUFn is not limited thereto.

Figure 6:
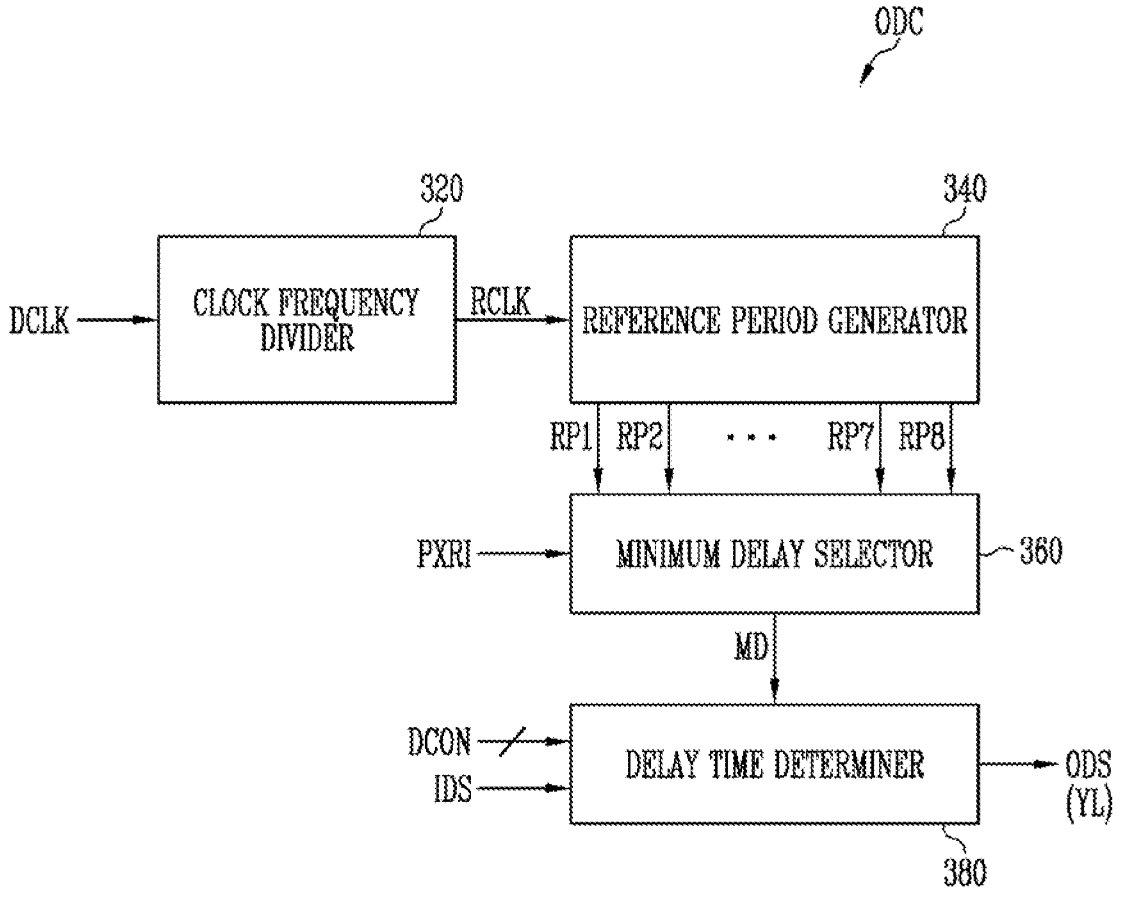
FIG. 6 is a block diagram illustrating an example of an output delay controller included in the data driving circuit of FIG. 5.
Figure 7:
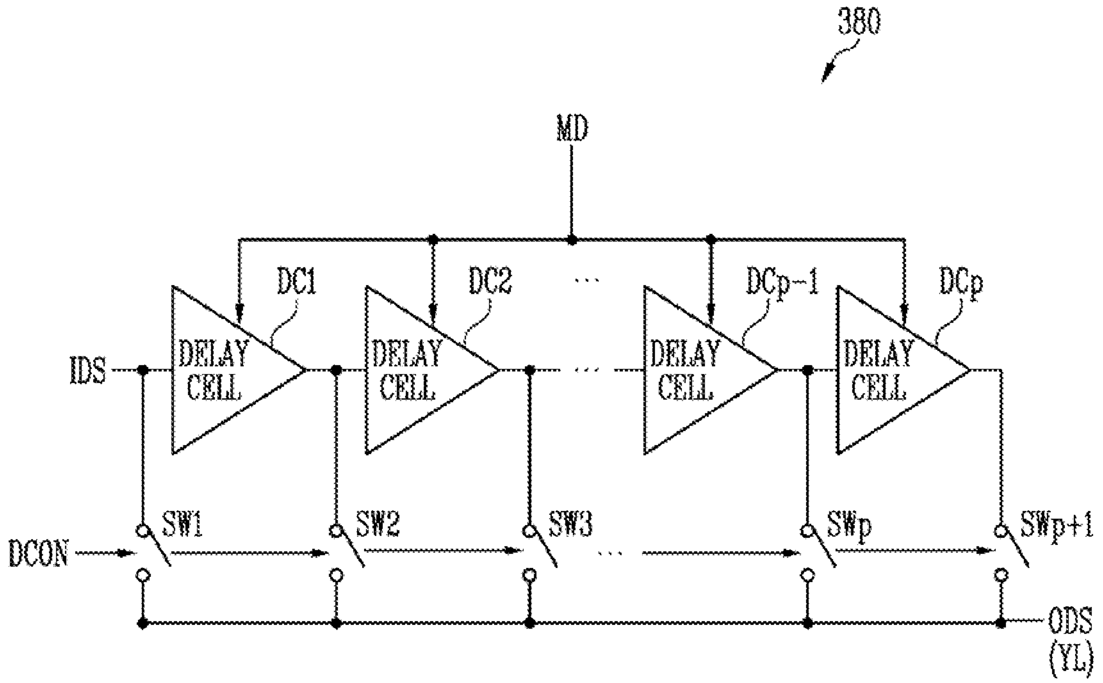
FIG. 7 is a diagram illustrating an example of a delay time determiner included in the output delay controller of FIG. 6.

FIG. 6 is a block diagram illustrating an example of an output delay controller included in the data driving circuit of FIG. 5, and FIG. 7 is a draw illustrating an example of a delay time determiner included in the output delay controller of FIG. 6. The components illustrated in FIGS. 6 and 7 may be implemented in hardware by circuits. It is to be understood, however, that each component shown in all of the drawings appended hereto may be implemented by a circuit.

Referring to FIGS. 1, 5, 6, and 7, the output delay controller ODC may include a clock frequency divider 320, a reference period generator 340, a minimum delay selector 360, and a delay time determiner 380.

In FIGS. 6 and 7, the configuration and operation of the output delay controller ODC will be described centering on some configurations for generating the output data signal ODS with one transmission line YL.

The clock frequency divider 320 may divide a frequency of the data transmission clock DCLK supplied from the timing controller 400. The frequency-divided data transmission clock DCLK may be provided to the reference period generator 340 as a reference clock RCLK.

The data transmission clock DCLK may correspond to a frequency (or a data rate) at which image data DATA is supplied from the timing controller 400 to the data driving circuit DIC. For example, a frequency of the data transmission clock DCLK may be about 3.0 GHz (e.g., corresponding to a data rate of 3.0 Gb/s), and thus, 3 gigabits of image data DATA per second may be supplied to the data driving circuit DIC.

Since the transmission speed is too fast to determine the delay time using the frequency of the data transmission clock DCLK as is, the delay time may not be properly controlled. Accordingly, the clock frequency divider 320 may reduce a frequency of the data transmission clock DCLK to 1/N (wherein N is an integer greater than 1). For example, depending on the setting of the display device 1000, the clock frequency divider 320 may divide the frequency of the data transmission clock DCLK into ½, ¼, ⅛, or the like.

In an embodiment of the present invention, a reference for dividing the frequency of the data transmission clock DCLK is the pixel row.

The clock frequency divider 320 may be implemented with various types of divider circuits, and may include a flip-flop circuit, or the like.

The reference period generator 340 may generate reference periods RP1 to RP8 (e.g., first to eighth reference periods RP1 to RP8) for delaying the output of data signals based on the period of the reference clock RCLK. In an embodiment of the present invention, the reference period generator 340 may determine clock periods corresponding to an integer multiple of a period of the reference clock RCLK as the reference periods RP1 to RP8. Each of the reference periods RP1 to RP8 may be a reference time for determining a delay time.

For example, when a frequency of the reference clock RCLK is 1.5 GHz, the first reference period RP1 may be determined to be about 0.667 ns. The second reference period RP2 may be twice the first reference period RP1 and may be determined to be about 1.333 ns. The third reference period RP3 may be determined to be about 2 ns, which is three times the first reference period RP1. In this way, the first to eighth reference periods RP1 to RP8 may be determined.

However, this is an example, and the number of reference periods and the relationship between the reference periods are not limited thereto. For example, the reference periods RP1 to RP8 may be set to a value other than an integer multiple of the first reference period RP1. In addition, the reference periods RP1 to RP8 may be calculated and expressed in a phase domain.

The minimum delay selector 360 may select one of the reference periods RP1 to RP8 as a minimum delay value MD based on the position information PXRI of the pixel row to which the data signals are to be supplied. The position information PXRI may include information on a position of the pixel row to which corresponding data signals are to be supplied. In addition, the position information PXRI may further include information on delay times of data signals in the data driving circuit DIC in the corresponding pixel row. The position information PXRI may be provided from the timing controller 400.

For example, when the scan delay of the corresponding pixel row is relatively small, the delay times of the data signals may also be determined to have a relatively small value. In this case, the minimum delay selector 360 may select one of the first to third reference periods RP1 to RP3 which are relatively small reference periods.

In contrast, when the scan delay of the corresponding pixel row is relatively large, the delay times of the data signals may also be determined to have a relatively large value. In this case, the minimum delay selector 360 may select one of the sixth to eighth reference periods RP6 to RP8 which are relatively large reference periods.

In other words, as the scan delay of the corresponding pixel row increases, a larger reference period may be selected.

The minimum delay value MD may be a minimum reference that can be delayed in a corresponding pixel row.

The delay time determiner 380 may determine the delay times of the transmission lines DLj to DLn based on the minimum delay value MD and the delay control signal DCON. In addition, the delay time determiner 380 may delay and output data signals by delay times. In other words, in one transmission line YL, the input data signal IDS may be output as a delayed output data signal ODS through the delay time determiner 380.

The delay control signal DCON may be determined based on the position information PXRI. The delay control signal DCON may be provided from the timing controller 400.

In an embodiment of the present invention, as shown in FIG. 7, the delay time determiner 380 may include a plurality of delay cells DC1 to DCp (wherein p is an integer greater than 1) and switches SW1 to SWp+1.

The delay cells DC1 to DCp may be connected in series to each other. The delay cells DC1 to DCp may delay and output an input signal based on a minimum delay value. In an embodiment of the present invention, each of the delay cells DC1 to DCp may include an inverter delay circuit. For example, the inverter delay circuit may include an inverter circuit, such as a configuration using CMOS. In addition, each of the delay cells DC1 to DCp may delay the output of the input data signal IDS by a time corresponding to the minimum delay value MD.

However, this is an example, and the configuration of the delay cells DC1 to DCp is not limited thereto. Each of the delay cells DC1 to DCp may be implemented with analog delay circuits of various configurations.

The first switch SW1 may be connected between the input terminal of the first delay cell DC1 and the transmission line YL. When the first switch SW1 is turned on, the input data signal IDS may be output to the transmission line YL without delay.

Each of the second to p+1-th switches SW2 to SWp+1 may be connected between the output terminals of the delay cells DC1 to DCp and the transmission line YL.

One of the first to p+1-th switches SW1 to SWp+1 may be turned on by the delay control signal DCON. Accordingly, a signal path to the transmission line YL through the turned-on switch may be formed, and a delay time for the output data signal ODS may be determined according to the number of delay cells through which the input data signal IDS has passed. In other words, the delay time may be large when a switch near an end of the delay cell chain is activated.

The delay control signal DCON may be determined in response to the position information PXRI. In addition, different delay control signals DCON may be supplied to each of the transmission lines YLj to YLn included in the data driving circuit DIC, so that delay times of the transmission lines YLj to YLn may be individually controlled.

In this way, the data driving circuit DIC may adaptively control the output delay of the data signal according to the position of the pixel row and the data line (e.g., the position of the pixel column). Accordingly, data signals may be supplied in response to a change in the RC delay of the scan signal according to the positions of the contacts of the scan lines SL in the single side driving structure, thereby increasing the charging rate and reducing the data signal noise.

An embodiment of the present invention provides a display device 1000 including: a display area 100 including pixels PX connected to data lines DL and scan lines SL, wherein the display area 100 includes a plurality of signal output lines OL1-OL3 connected to each of the scan lines SL through a contact (CNT1, CNT2, CNT3); a data driver 300 including a first data driving circuit DIC disposed at a side of the display area 100 to drive the data lines DL; a scan driver 200 disposed at the side of the display area 100 to drive the scan lines SL; and a timing controller 400 for controlling the data driver 300 and the scan driver 200. The first data driving circuit DIC includes: output buffers BUFj-BUFn which respectively output data signals to first to k-th data lines (wherein k is an integer greater than 2) of the data lines DL; and an output delay controller ODC which transmits the data signals to the output buffers through BUFj-BUFn first to k-th transmission lines YL, and controls delay times of the data signals output to the first to k-th transmission lines YL based on position information PXRI of a pixel row to which the data signals are to be supplied.

Figure 8:
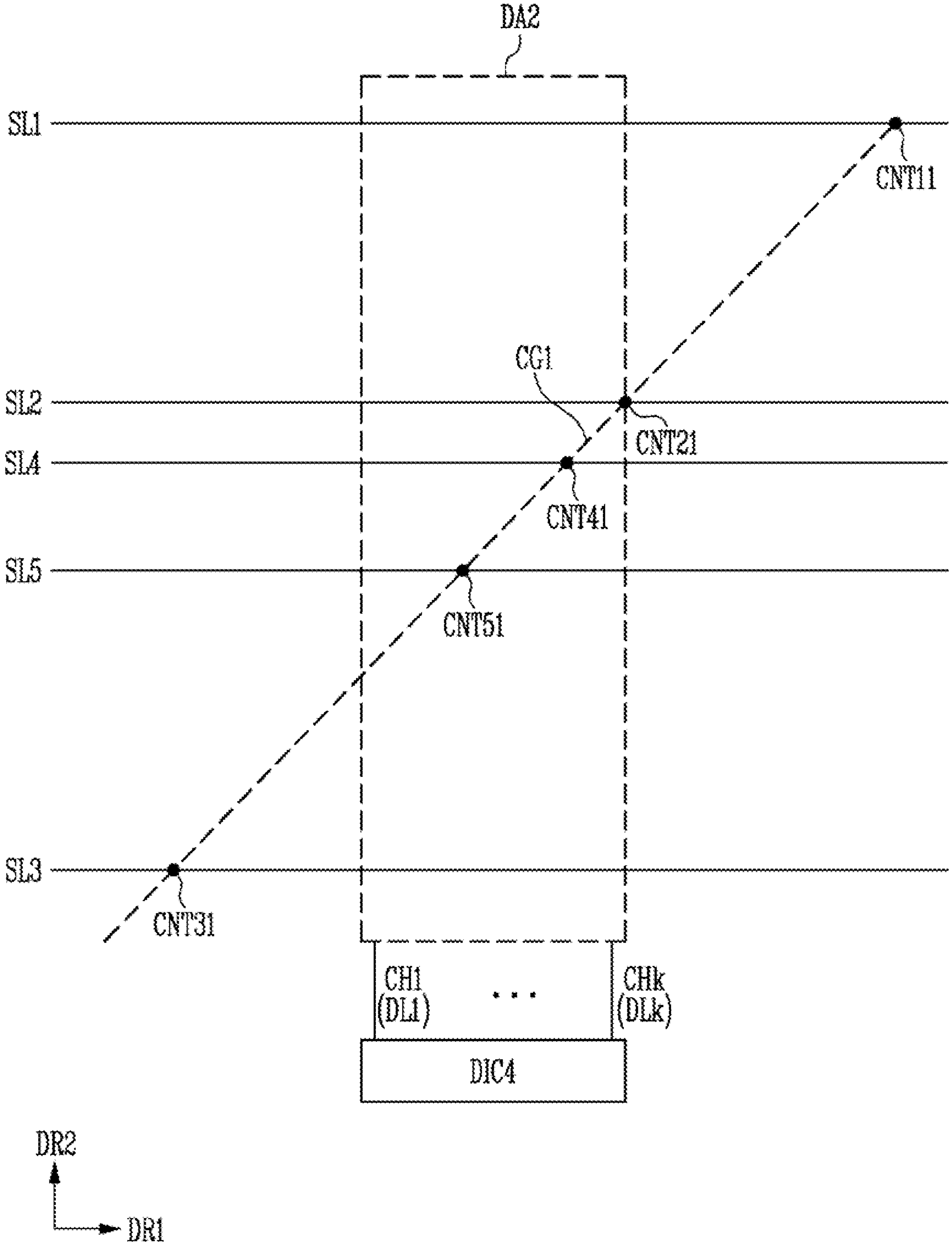
FIG. 8 is a diagram illustrating an example of a driving area driven by the data driving circuit of FIG. 5.

FIG. 8 is a diagram illustrating an example of a driving area driven by the data driving circuit of FIG. 5, Referring to FIGS. 1, 4, 5, and 8, the fourth data driving circuit DIC4 may be connected to the first to k-th channels CH1 to CHk to provide data signals to pixels corresponding to a second driving area DA2 of the display area 100.

The first to k-th channels CH1 to CHk may correspond to the first to k-th data lines DL1 to DLk, and the first to k-th data lines DL1 to DLk may extend to the second driving area DA2. For example, the fourth data driving circuit DIC4 may be connected to 960 channels corresponding to 960 data lines.

Hereinafter, output timings of data signals supplied to pixel rows corresponding to the first to fifth scan lines SL1 to SL5 will be described in detail with reference to FIGS. 9A to 12. Here, the first to fifth scan lines SL1 to SL5 are arbitrarily named to describe the positional relationship between the first to fifth contacts CNT11 to CNT51. A scan direction for driving the display area 100 may be a second direction DR2 or a direction opposite to the second direction DR2.

For example, when the scan signal is supplied to the first scan line SL1, the fourth data driving circuit DIC4 may generate data signals corresponding to pixels in the second driving area DA2 of the first pixel row connected to the first scan line SL1.

As shown in FIG. 8, the first contact group CG1 may pass through the second driving area DA2. The first contact CNT11 of the first scan line SL1 may be provided at a right side of an outer area of the second driving area DA2, and the second contact CNT21 of the second scan line SL2 may be provided near the right border of the second driving area DA2. In other words, the first contact CNT1 and the second contact CNT2 may be closer to the k-th data line CHk (or the k-th data line DLk) than they are to the first channel CH1 (or the first data line DL1).

The third contact CNT31 of the third scan line SL3 may be provided at a left side of the outer area of the second driving area DA2. The third contact CNT3 may be closer to the first channel CH1 (or the first data line DL1) than it is to the k-th channel CHk (or the k-th data line DLk).

Each of the fourth contact CNT41 of the fourth scan line SL4 and the fifth contact CNT51 of the fifth scan line SL5 may be located in the second driving area DA2.

Figure 9A:
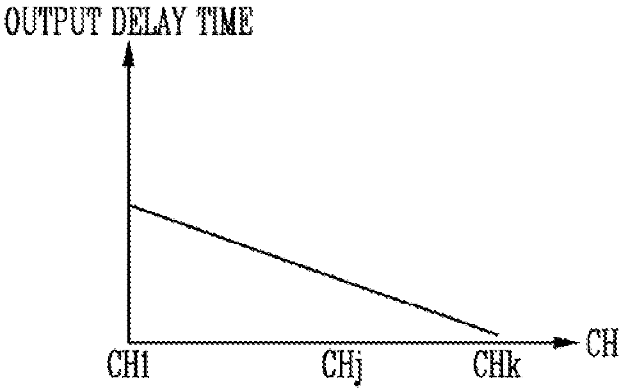
FIG. 9A is a diagram illustrating an example of output delay times of data signals output to the driving area of FIG. 8.
Figure 9B:
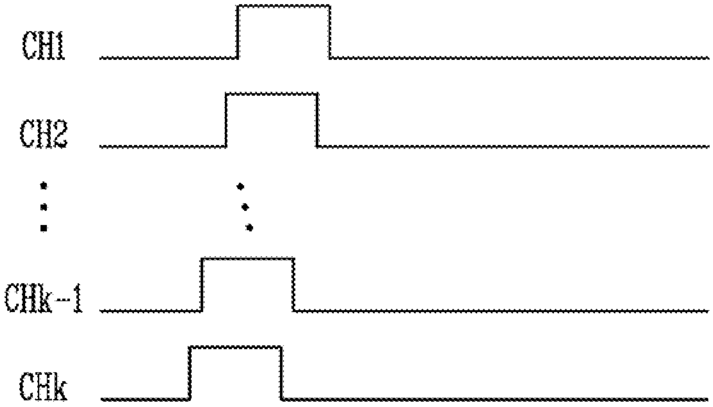
FIG. 9B is a timing diagram illustrating an example of outputs of data signals by output delay times of FIG. 9A.
Figure 10A:
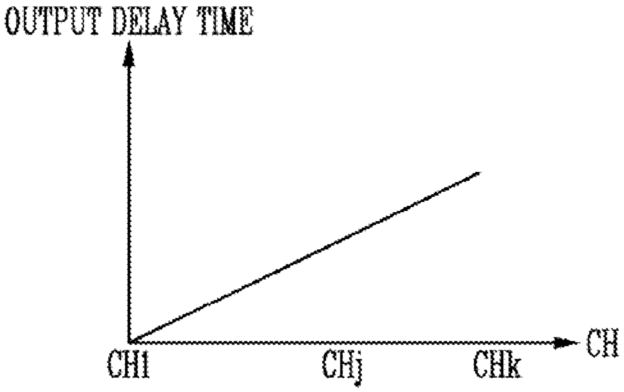
FIG. 10A is a diagram illustrating another example of output delay times of data signals output to the driving area of FIG. 8.
Figure 10B:
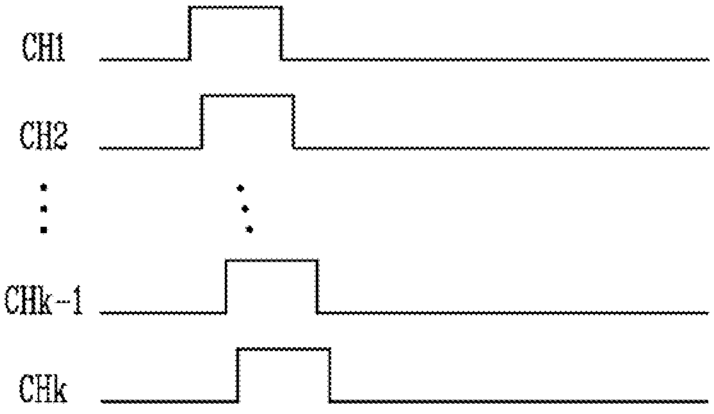
FIG. 10B is a timing diagram illustrating an example of outputs of data signals by output delay times of FIG. 10A.

FIG. 9A is a diagram illustrating an example of output delay times of data signals output to the driving area of FIG. 8, and FIG. 9B is a timing diagram illustrating an example of outputs of data signals by the output delay times of FIG. 9A. FIG. 10A is a diagram illustrating another example of output delay times of data signals output to the driving area of FIG. 8, and FIG. 10B is a timing diagram illustrating an example of outputs of data signals by the output delay times of FIG. 10A.

Referring to FIGS. 1, 4, 5, 8, 9A, 9B, 10A, and 10B, delay times of data signals supplied from the fourth data driving circuit DIC4 to the first to k-th channels CH1 to CHk may be adjusted differently according to the scan line to which the scan signal is supplied.

As described above, the delay of the scan signal in the second driving area DA2 disposed at the left of the first contact CNT11 may increase in a direction opposite to the first direction DR1, which is a direction away from the first contact CNT11. For example, as shown in FIGS. 9A and 9B, the delay time of the data signal output to the first channel CH1 may be the largest, and the delay time of the data signal output to the k-th channel CHk may be the smallest. In other words, the delay time of the data signal output to the first channel CH1 may occur after the delay time of the data signal output to the k-th channel CHk. The delay time of the data signal output to the first channel CH1 may also occur after the delay time of the data signal output to the second channel CH2.

The output of the data signals corresponding to the second scan line SL2 including the second contact CNT21 may also be similar to the output trend of FIGS. 9A and 9B.

Conversely, the delay of the scan signal in the second driving area DA2 disposed at the right of the third contact CNT31 may increase in the first direction DR1, which is a direction away from the third contact CNT31. For example, as shown in FIGS. 10A and 10B, the delay time of the data signal output to the k-th channel CHk may be the largest, and the delay time of the data signal output to the first channel CH1 may be the smallest. In other words, the delay time of the data signal output to the k-th channel CHk may occur after the delay time of the data signal output to the first channel CH1.

However, this is an example, and the delay and equivalent impedance of the scan signal corresponding to the second driving area DA2 may be calculated by reflecting the equivalent impedance component due to the second contact group CG2 of FIG. 4. For example, an influence of an output signal (e.g., a scan signal) supplied from a contact of the second contact group CG2, which is not shown, may be applied in the second driving area DA2. In this case, the delay time of the data signal corresponding to the j-th channel may be greater than the delay time of the data signal corresponding to the k-th channel CHk (e.g., k is 960 and j is 800).

In this way, the delay direction of the outputs of data signals corresponding to different pixel rows in one frame may be adaptively changed according to the positional relationship between the second driving area DA2 and the contacts.

Figure 11:
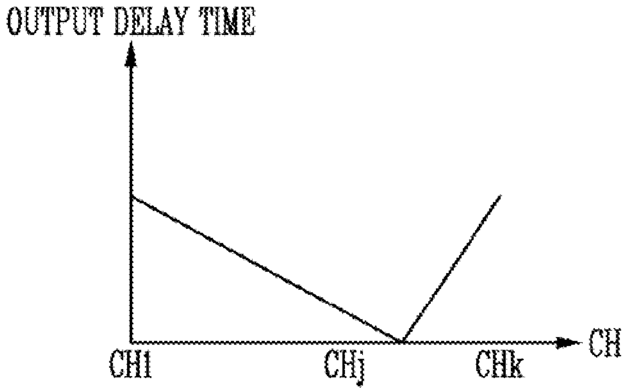
FIG. 11 is a diagram illustrating another example of output delay times of data signals output to the driving area of FIG. 8.
Figure 12:
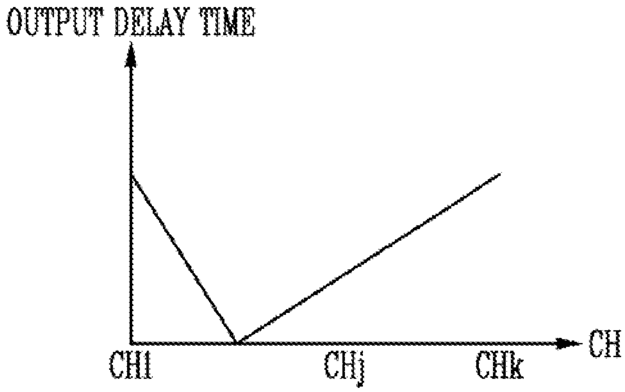
FIG. 12 is a diagram illustrating another example of output delay times of data signals output to the driving area of FIG. 8.

FIG. 11 may be a diagram illustrating another example of output delay times of data signals output to the driving area of FIG. 8, and FIG. 12 is a diagram illustrating another example of output delay times of data signals output to the driving area of FIG. 8.

Referring to FIGS. 1, 4, 5, 8, 11, and 12, the delay times of the data signals supplied from the fourth data driving circuit DIC4 to first to k-th channels CH1 to CHk may be adjusted differently according to a scan line to which a scan signal is supplied.

As shown in FIGS. 11 and 12, the fourth contact CNT4 and the fifth contact CNT5 may be disposed in the second driving area DA2.

In the fourth scan line SL4, the delay of the scan signal in the fourth contact CNT4 may be the smallest. For example, the fourth contact CNT4 may be closer to the j-th data line (wherein j is an integer between 1 and k) than the first data line DL1 and the k-th data line DLk. In addition, the delay of the scan signal may increase as it goes toward both sides of the fourth contact CNT4. In response to the delay of the scan signal, the output delay tendency of the data signals as shown in FIG. 11 may appear. For example, the output delay may increase from a point after the j-th channel CHj to the k-th channel CHk and the output delay may decrease from the first channel CH1 to the point after the j-th channel CHj.

Likewise, in the fifth scan line SL5, the delay of the scan signal in the fifth contact CNT5 may be the smallest. In addition, the delay of the scan signal may increase toward both sides of the fifth contact CNT5. In response to the delay of the scan signal, the output delay tendency of the data signals as shown in FIG. 12 may appear. For example, the output delay may increase from a point before the j-th channel CHj to the k-th channel CHk and the output delay may decrease from the first channel CH1 to the point before the j-th channel CHj.

As described above, the data driving circuit DIC and the display device including the same according to the embodiments of the present invention can adaptively adjust the delay time of the output of data signals for each pixel row and each pixel column (e.g., data line) according to an arrangement of contacts in the display area by the short side driving structure.

For example, the direction of increasing the delay time of supplying data signals for each pixel row in one frame may be changed according to the position of the pixel row and the contact.

Therefore, since the output of the data signal is adjusted in response to the delay of the scan signal, the deviation of the data signal noise and the deviation of the charging rate of the data signal according to the position of the pixel due to the characteristic of the contact arrangement structure in the display area of the scan lines of the single side driving structure, can be improved. Accordingly, the image quality of the display device 1000 having the single side driving structure may be increased.

Figure 13:
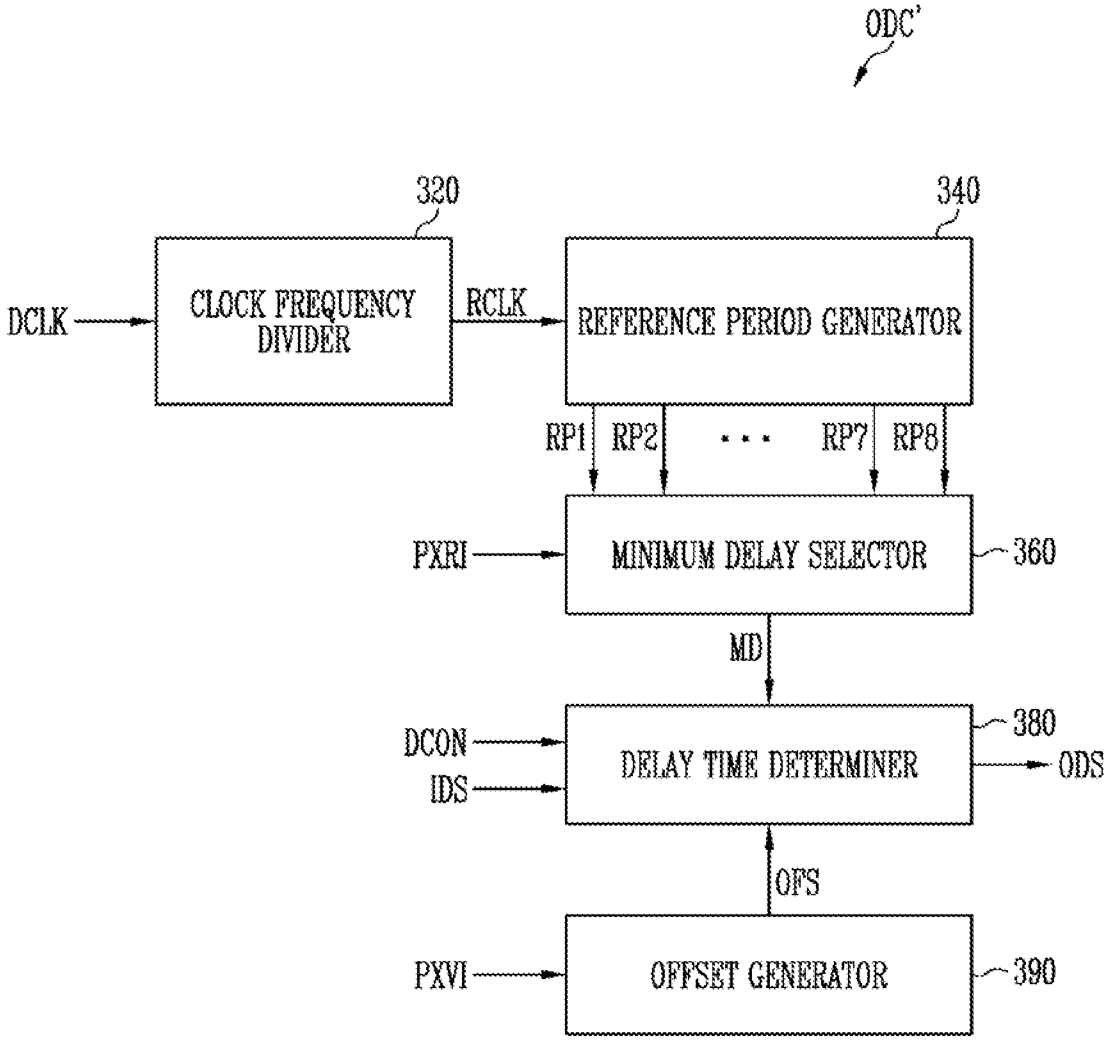
FIG. 13 is a block diagram illustrating another example of an output delay controller included in the data driving circuit of FIG. 5.
Figure 14:
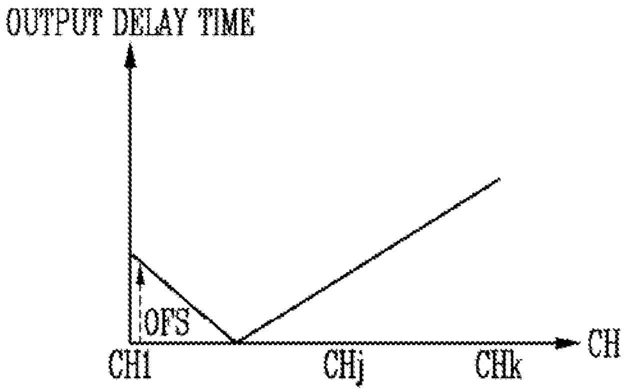
FIG. 14 is a diagram illustrating an example of output delay times of data signals output to the driving area of FIG. 8 by the output delay controller of FIG. 13.
Figure 15:
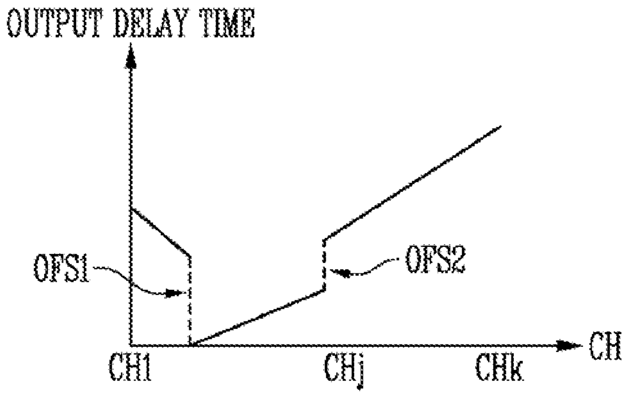
FIG. 15 is a diagram illustrating another example of output delay times of data signals output to the driving area of FIG. 8 by the output delay controller of FIG. 13.

FIG. 13 is a block diagram illustrating another example of an output delay controller included in the data driving circuit of FIG. 5, FIG. 14 is a diagram illustrating an example of output delay times of data signals output to the driving area of FIG. 8 by the output delay controller of FIG. 13, and FIG. 15 is a diagram illustrating another example of output delay times of data signals output to the driving area of FIG. 8 by the output delay controller of FIG. 13.

In FIG. 13, the same reference numerals are used for constituent elements described with reference to FIG. 6, and redundant descriptions of these constituent elements may be omitted. In addition, the output delay controller ODC' of FIG. 13 may have a configuration substantially the same as or similar to the output delay controller ODC of FIG. 6 except that the offset generator 390 is further included.

Referring to FIGS. 4, 13, 14, and 15, the output delay controller ODC' may include a clock frequency divider 320, a reference period generator 340, a minimum delay selector 360, and a delay time determiner 380, and an offset generator 390.

The offset generator 390 may apply an offset OFS to the delay time of the output of the data signal based on a pixel column information PXVI. For example, the equivalent impedance of the scan line and the delay of the scan signal may be different according to the position of the data driving circuits DIC1 to DIC24 and the pixel column for the same pixel row. The offset generator 390 may apply an offset OFS of a prestored delay time to each of the data driving circuits DIC1 to DIC24.

In an embodiment of the present invention, as shown in FIG. 14, the offset OFS may be applied to the delay time of the data signal corresponding to the first channel CH1. In this case, the delay time in the first channel CH1 of the data driving circuit to which the delay time of FIG. 14 is applied may be smaller than the first channel CH1 of the data driving circuit to which the delay time of FIG. 12 is applied. In other words, the output delay time of the first channel CH1 in FIG. 12 is greater than the output delay time of the first channel CH1 in FIG. 14 due to the offset OFS applied thereto. The delay times applied to other channels (or data lines) may be changed by applying the offset OFS.

In an embodiment of the present invention, as shown in FIG. 15, offsets OFS1 and OFS2 may be applied to intermediate channels of the channels CH1 to CHk. In other words, the offsets OFS1 and OFS2 may be applied to channels between the channels CH1 to CHk. As described above, since the offsets OFS, OFS1, and OFS2 are additionally applied to the change the difference in the delay time of the scan signal for each pixel row and each pixel column in the single side driving structure, the data charging rate can be further improved.

As described above, the data driving circuit and the display device including the same according to embodiments of the present invention may include an output delay controller for adaptively adjusting the delay time of the output of data signals for each pixel row and each pixel column (e.g., each data line) according to an arrangement of contacts in the display area by the single side driving structure. In other words, the data driving circuit and the display device including the same according to embodiments of the present invention can adjust an output delay time of data signals based on positions of contacts and pixels of the display device having the single side driving structure. Accordingly, the outputs of the data signals may be adjusted in response to a delay of a scan signal. Thus, variation in the data signal noise and variation in charging rate of the data signal according to the position of the pixel due to the characteristic of the contact arrangement structure in the display area of the scan lines of the single side driving structure can be improved. Accordingly, image quality of the display device having the single side driving structure may be increased.

While the present invention has been shown and described with reference to embodiments thereof, it will be understood by those skilled in the art that various changes in form and detail may be made thereto without departing from the spirit and scope of the present invention as set forth by the appended claims and their equivalents.

What is claimed is:

1. A display device, comprising:

a display area including pixels connected to data lines and scan lines, wherein the display area includes a plurality of signal output lines connected to each of the scan lines through a plurality of contacts;

a data driver including a first data driving circuit disposed at a side of the display area to drive the data lines;

a scan driver disposed at the side of the display area to drive the scan lines; and a timing controller for controlling the data driver and the scan driver, wherein the display area includes first to third pixel blocks continuous in a first direction, and each of the first to third pixel blocks includes first to k-th (where k is an integer greater than 2) data lines included in a driving region, wherein the first data driving circuit comprises:

output buffers which respectively output data signals to the first to k-tin data lines of the data lines; and an output delay controller which transmits the data signals to the output buffers through first to k-th transmission lines, and controls delay times of the data signals output to the first to k-th transmission lines based on position information of a pixel row to which the data signals are to be supplied and a positional relationship between the contacts and the first to K-th data lines, wherein the delay times increase in the first direction away from the the driving region or increase in a direction opposite the first direction away from the contacts in the driving region, wherein times at which the data signals are output from the output buffers to the first to k-th data lines are respectively adjusted based on the delay times, wherein the plurality of signal output lines comprises:

first output lines connected to each of the scan lines in the first pixel block;

second output lines connected to each of the scan lines in the second pixel block; and third output lines connected to each of the scan lines in the third pixel block, wherein the scan lines extend in the first direction, and the first to third output lines extend in a second direction crossing the first direction, wherein the first output lines connect a first scan line of the scan lines in a first contact among the contacts, wherein the second output lines connect the first scan line in a second contact among the contacts, wherein the third output lines connect the first scan line in a third contact among the contacts, wherein the delay times decrease from the first pixel block to the third pixel block, wherein a portion of the first scan line between the first contact and the second contact has a largest resistance component, and wherein a portion of the first scan line on a right side of the third contact has a smallest resistance component.

2. The display device of claim 1, wherein the output delay controller controls the delay times based on distances between one of the contacts and the first to k-th data lines in the first direction.

3. The display device of claim 1, wherein the first output lines connect to a second scan line of the scan lines in a fourth contact among the contacts, wherein the second output lines connect the second scan line in a fifth contact among the contacts, wherein the third output lines connect the second scan line in a sixth contact among the contacts, and wherein the delay times increase from the first pixel block to the third pixel block.

4. The display device of claim 3, wherein the second scan line is disposed closer to the scan driver and the data driver than the first scan line.

5. A display device, comprising:

a display area including pixels connected to data lines and scan lines, wherein the display area includes a plurality of signal output lines connected to each of the scan lines through a plurality of contacts;

a data driver including a first data driving circuit disposed at a side of the display area to drive the data lines;

a scan driver disposed at the side of the display area to drive the scan lines; and a timing controller for controlling the data driver and the scan driver, wherein the display area includes first to third pixel blocks continuous in a first direction, and each of the first to third pixel blocks includes first to k-th (where k is an integer greater than 2) data lines included in a driving region, wherein the first data driving circuit comprises;

output buffers which respectively output data signals to the first to k-th data lines of the data lines; and an output delay controller which transmits the data signals to the output buffers through first to k-th transmission lines, and controls delay times of the data signals output to the first to k-th transmission lines based on position information of a pixel row to which the data signals are to be supplied and a positional relationship between the contacts and the first to K-th data lines, wherein the delay times increase in the first direction away from the contacts in the driving region or increase in a direction opposite the first direction away from the contacts in the driving region, wherein times at which the data signals are output from the output buffers to the first to k-th data lines are respectively adjusted based on the delay times, and wherein the output delay controller comprises:

a clock frequency divider which divides a frequency of a data transmission clock supplied from the timing controller to generate a reference clock;

a reference period generator which generates reference periods for delaying an output of the data signals based on a period of the reference clock;

a minimum delay selector which selects one of the reference periods as a minimum delay value based on the position information of the pixel row to which the data signals are to be supplied; and a delay time determiner which determines the delay times based on the minimum delay value and a delay control signal, and delays and outputs the data signals by the delay times.

6. A display device, comprising:

a display area including pixels connected to data lines and scan lines, wherein the display area includes a plurality of signal output lines connected to each of the scan lines through a plurality of contacts;

a data driver including a first data driving circuit disposed in a first driving region to drive a portion of the data lines and a second data driving circuit disposed in a second driving region to drive another portion of the data lines;

a scan driver disposed at the side of the display area to drive the scan lines; and a timing controller for controlling the data driver and the scan driver, wherein each of the first data driving circuit and the second data driving circuit comprises:

output buffers which respectively output data signals to the first to k-th data lines of the data lines; and an output delay controller which transmits the data signals to the output buffers through first to k-th transmission lines, and controls delay times of the data signals output to the first to k-th transmission lines based on position information of a pixel row to which the data signals are to be supplied and a positional relationship between the contacts and the first to K-th data lines, and wherein the data driver independently controls the delay times of the data signals output from the data lines with respect to the first data driving circuit and the second data driving circuit, wherein the display area includes first to third pixel blocks continuous in a first direction, wherein each of the first to third pixel blocks includes the first data driving circuit and the second data driving circuit, wherein the plurality of signal output lines comprises:

first output lines connected to each of the scan lines in the first pixel block;

second output lines connected to each of the scan lines in the second pixel block; and third output lines connected to each of the scan lines in the third pixel block, wherein the scan lines extend in the first direction, and the first to third output lines extend in a second direction crossing the first direction, wherein the first output lines connect a first scan line of the scan lines in a first contact among the contacts, wherein the second output lines connect the first scan line in a second contact among the contacts, wherein the third output lines connect the first scan line in a third contact among the contacts, wherein the delay times decrease from the first pixel block to the third pixel block, wherein a portion of the first scan line between the first contact and the second contact has a largest resistance component, and wherein a portion of the first scan line on a right side of the third contact has a smallest resistance component.

7. The display device of claim 6, wherein the output delay controller comprises:

a clock frequency divider which divides a frequency of a data transmission clock supplied from the timing controller to generate a reference clock;

a reference period generator which generates reference periods for delaying an output of the data signals based on a period of the reference clock;

a minimum delay selector which selects one of the reference periods as a minimum delay value based on the position information of the pixel row to which the data signals are to be supplied; and a delay time determiner Which determines the delay times based on the minimum delay value and a delay control signal, and delays and outputs the data signals by the delay times.

* * * * *